United States Patent
Yazaki et al.

(10) Patent No.: US 9,298,594 B2
(45) Date of Patent: Mar. 29, 2016

(54) TESTING APPARATUS AND TESTING METHOD

(71) Applicant: NTT DOCOMO, INC., Chiyoda-ku (JP)

(72) Inventors: Hidetoshi Yazaki, Chiyoda-ku (JP); Koichi Asano, Minato-ku (JP); Takehisa Takahashi, Minato-ku (JP); Tami Wakabayashi, Minato-ku (JP)

(73) Assignee: NTT DOCOMO, INC., Chiyoda-ku (JP)

( * ) Notice: Subject to any disclaimer, the term of this patent is extended or adjusted under 35 U.S.C. 154(b) by 125 days.

(21) Appl. No.: 14/240,756

(22) PCT Filed: Nov. 19, 2012

(86) PCT No.: PCT/JP2012/079997
§ 371 (c)(1),
(2) Date: Feb. 25, 2014

(87) PCT Pub. No.: WO2013/077299
PCT Pub. Date: May 30, 2013

(65) Prior Publication Data
US 2014/0325281 A1    Oct. 30, 2014

(30) Foreign Application Priority Data
Nov. 24, 2011 (JP) .................................. 2011-256422

(51) Int. Cl.
*G06F 11/00* (2006.01)
*G06F 11/36* (2006.01)
(Continued)

(52) U.S. Cl.
CPC .......... *G06F 11/3676* (2013.01); *G06F 3/0488* (2013.01); *G06F 3/04817* (2013.01);
(Continued)

(58) Field of Classification Search
CPC . G06F 11/3688; G06F 11/3664; G06F 11/36; G06F 11/3668; G06F 11/3672; G06F 11/362
See application file for complete search history.

(56) References Cited

U.S. PATENT DOCUMENTS

| | | | |
|---|---|---|---|
| 2006/0156288 A1* | 7/2006 | Jones | G06F 9/547 717/124 |
| 2007/0033441 A1* | 2/2007 | Sathe | G06F 11/36 714/38.14 |

(Continued)

FOREIGN PATENT DOCUMENTS

JP    2005-539325    12/2012

OTHER PUBLICATIONS

International Search Report Issued Feb. 5, 2013 in PCT/JP12/079997 filed Nov. 19, 2012.

*Primary Examiner* — Charles Ehne
(74) *Attorney, Agent, or Firm* — Oblon, McClelland, Maier & Neustadt, L.L.P

(57) ABSTRACT

A testing apparatus for evaluating operations by software installed in a mobile terminal includes a scenario setting unit for setting a scenario including operation information for executing functions that are performed by the mobile terminal, an operation determining unit for determining whether an operation indicated by the operation information included in the scenario is influenced by a device installed in the mobile terminal, an operation target converting unit for converting the operation determined to be influenced by the device installed in the mobile terminal according to the device installed in the mobile terminal, a scenario executing unit for executing the scenario set by the scenario setting unit according to the operation converted by the operation target converting unit, and a scenario execution result determining unit for determining whether an execution result of the scenario executed by the scenario execution unit is the same as a result assumed in advance.

6 Claims, 12 Drawing Sheets

(51) Int. Cl.
*G06F 3/0481* (2013.01)
*G06F 3/0484* (2013.01)
*G06F 3/0488* (2013.01)

(52) U.S. Cl.
CPC .......... *G06F3/04842* (2013.01); *G06F 11/362* (2013.01); *G06F 11/3664* (2013.01); *G06F 11/3668* (2013.01); *G06F 11/3672* (2013.01); *G06F 11/3688* (2013.01)

(56) References Cited

U.S. PATENT DOCUMENTS

2010/0095159 A1* 4/2010 Jeong .................. G06F 11/3688
714/38.1
2012/0198279 A1* 8/2012 Schroeder ........... G06F 11/2294
714/32

* cited by examiner

FIG.7

| OPERATION | DEVICE DEPENDENCY |
|---|---|
| SCREEN PUSH | YES |
| KEY PRESS | YES |
| GPS MEASUREMENT | YES |
| EMAIL DELIVERY CONFIRMATION | NO |
| APPLICATION UPDATE | NO |
| ⋮ | ⋮ |

FIG.8

| PART NAME | FUNCTION LAYER | PART TYPE | X LOCATION | Y LOCATION | HEIGHT | WIDTH |
|---|---|---|---|---|---|---|
| FUNCTION 1 | 1-1 | PUSH BUTTON | 0 | 0 | 30 | 50 |
| FUNCTION 2 | 1-2 | PUSH BUTTON | 0 | 35 | 30 | 50 |
| ... | ... | ... | ... | ... | ... | ... |

TESTING APPARATUS AND TESTING METHOD

TECHNICAL FIELD

The present invention relates to a testing apparatus for a mobile terminal.

BACKGROUND ART

Because of its functional advancement, operation procedures of a mobile terminal have become more complicated. And with the advancement in functionalities, operation steps for executing a function have also increased. Furthermore, the volume of software to be stored in a mobile terminal is also increasing. With the increase in software volume, the number of defects is also increasing. Regarding these defects, it is practically impossible to detect them all beforehand. Therefore evaluating software installed in a mobile terminal has been performed.

For example, an evaluating method using an automated evaluation tool is known. In order to use the evaluation method of the automated evaluation tool, it is necessary for software installed in the target mobile terminal to include, as one of operation methods of the software, predefined operation procedures. Furthermore, it is necessary for a user to be able to use desired functions by pressing menu buttons or by pressing ten key buttons.

An evaluation method using an automated evaluation tool includes a functional method. In the functional method, a specific function of a mobile terminal is evaluated by a predefined operation procedure. By evaluating a specific function, it is possible to check if the specific function of software installed in a mobile terminal functions properly in accordance with the required specifications.

For example, in the case where a specific function of a mobile terminal that includes an input device such as a touch panel, etc., is evaluated, there is a case in which a process corresponding to the pressing of a certain icon displayed in the touch panel is performed according to a certain scenario. In this case, an area for the certain icon to be selected is specified, and the process corresponding to the pressing of a certain position included in the area is performed by an automated evaluation tool. By having the process for the pressing of a certain icon performed by the automated evaluation tool, it is determined whether the process performed by the pressing meets required specifications or not.

For example, a method of non-linear corrections in touch screens is known (e.g., refer to patent document 1).

RELATED ART DOCUMENT

[Patent Document 1] Japanese Patent Application Publication No. 2005-539325

SUMMARY OF THE INVENTION

Problem to be Solved by the Invention

There is a case where a function targeted for evaluation cannot be performed by the same operation due to the difference of the device included in the mobile terminal.

For example, there is a case where sizes or resolutions of output screens are different among mobile terminals (apparatuses). That is, sometimes, for each mobile terminal (each apparatus), an installed device is different. In the case of an input of a touch panel method, the size or the resolution of the screen is different depending on the device.

In an automated evaluation tool, in order to make it universal, taking advantage of coordinates, it is often the case that operation commands that include a command specifying a certain location of a display screen are created. For example, taking advantage of X-Y coordinates, operation commands that include a command specifying a certain location of a display screen are created. Also, in a scenario created for evaluating a certain function, operation commands that include a command specifying a certain location of a display screen are included.

Therefore, there is a case where once a scenario is created, due to a device dependency, the scenario cannot be used with other mobile terminals (apparatuses). The reason is that there is a case where, depending on the size or the resolution of the screen, locations (X-Y coordinates) where parts are installed are different. The reason is that there is a case where operation commands created based on coordinates of installing locations of software parts, such as buttons, for operating a specific function are included in a scenario.

Therefore, regarding scenarios created by an automated evaluation tool, the scenarios' re-usability for other apparatuses becomes low except for the apparatus for which the scenarios are created.

To be more precise, the size and the resolution of the touch panel included in mobile terminals varies. Therefore, an area for a certain icon to be selected is needed to be specified for each size or each resolution of the touch panel included in mobile terminals. That is, the automated evaluation tool needs to be modified in accordance with the size and the resolution of the touch panel included in mobile terminals.

For example, in the case where a resolution of a touch panel of a mobile terminal is different, there is a possibility that at least one of the horizontal coordinate and the vertical coordinate of an icon located in the touch panel is different. Therefore, in the case where a process is performed in which the same application is run and the area is specified by coordinates when specifying an area for an icon to be selected, there may be a different area specified.

It is an object of the present invention, in order to solve the above problems, regardless of the device included in a mobile terminal, to test functions performed by software installed in the mobile terminal.

Means for Solving the Problem

The present testing apparatus is implemented as a testing apparatus for evaluating operations performed by software installed in a mobile terminal, including a scenario setting unit configured to set a scenario including operation information for performing functions to be executed by the mobile terminal, an operation determining unit configured to determine whether an operation indicated by the operation information included in the scenario set by the scenario setting unit is influenced or not by the device installed in the mobile terminal, an operation target converting unit configured to convert an operation determined to be influenced by the device installed in the mobile terminal in accordance with the device installed in the mobile terminal, a scenario execution unit configured to execute a scenario set by the scenario setting unit based on the operation converted by the operation target converting unit, and a scenario execution result determining unit configured to determine whether an execution result of the scenario executed by the scenario execution unit is the same as a result assumed in advance.

The operation determining unit may be configured to determine that the operation is influenced by the device installed in the mobile terminal in the case where at least one of a screen-push operation and a key-press operation is included in the operation indicated by the operation information included in the scenario set by the scenario setting unit.

The operation target converting unit may be configured to calculate the range of the coordinates for executing at least one of a screen-push operation and a key-press operation by analyzing the information of the screen displayed by the mobile terminal in the case where the at least one of the screen-push operation and the key-press operation is included in the operation that is determined by the operation determining unit to be influenced by the device installed in the mobile terminal.

The operation target converting unit may be configured to analyze the information of the screen obtained by a function installed in the mobile terminal for obtaining the information of the screen.

The operation determining unit may be configured to determine that the operation is influenced by the device installed in the mobile terminal in the case where an operation for executing a GPS measurement is included in the operation indicated by the operation information included in the scenario set by the scenario setting unit.

The operation target converting unit may be configured to convert at least one of a measurement command for executing the GPS measurement and a parameter in the case where an operation for executing the GPS measurement is included in the operation that is determined by the operation determining unit to be influenced by the device installed in the mobile terminal.

The scenario may be configured to include one or a plurality of the functions performed by the mobile terminal.

Also, the present invention may be configured to be a testing method or a program to be executed by the testing apparatus above.

Effect of the Present Invention

According to the disclosed embodiments of the present invention, regardless of the device included in a mobile terminal, functions performed by software installed in the mobile terminal can be tested.

BRIEF DESCRIPTION OF THE DRAWINGS

FIG. 7 is a drawing illustrating an example of the present embodiments of device dependency definition.

FIG. 8 is a drawing illustrating an example of the present embodiments of an analysis result of screen information.

EMBODIMENTS FOR CARRYING OUT THE INVENTION

In the following, embodiments of the present invention will be described by referring to the accompanying drawings. Note that throughout the drawings for describing the present embodiments, the same referral numbers are used for the same functionalities, and the repeated description will be omitted.

Embodiments

<Testing Apparatus 100>

An automated evaluation tool of the present embodiments is installed in a PC (Personal Computer), etc. Also, the automated evaluation tool may be installed in an apparatus for testing functions performed by software installed in a mobile terminal.

In the present embodiment, as an example, a case is described where an automated evaluation tool is installed in a PC. By having an automated evaluation tool installed in a PC, the PC functions as a testing apparatus 100 of a mobile terminal.

By the automated evaluation tool of a mobile terminal, scenarios related to operations for performing the target functions are created in advance.

The testing apparatus 100 determines which scenario to use from the scenarios created in advance to be used for evaluating functions of a mobile terminal.

The testing apparatus 100, when executing an operation for performing a target function according to the determined scenario, determines whether the operation depends on a device of the mobile terminal or not. That is, the testing apparatus 100 determines whether the operation is influenced or not by the device difference. In other words, the testing apparatus 100 determines whether the operation can be the same operation or not even when the device is different. For example, in the case where the operation is an input for a touch panel, the operation is determined to be influenced by the difference of the device such as the size, the resolution, etc., of the touch panel. Regarding an input for a touch panel, the input location is assumed to be specified by the coordinates.

Also, for example, in the case where the operation is a GPS measurement, it is determined to be influenced by GPS chips, etc. There exist various kinds of GPS chips installed in mobile terminals. The reason is that it is assumed that there are cases where different commands of GPS measurement or different parameters are described depending on the GPS chips because there exist various kinds of GPS chips.

In the case where it is determined that the operation is influenced by the device difference, the testing apparatus 100 converts the operation contents to fit the device.

The testing apparatus 100 executes the operation for performing the target function based on the determined scenario, and determines whether the result of the executed operation is correct or not.

Figure 1:
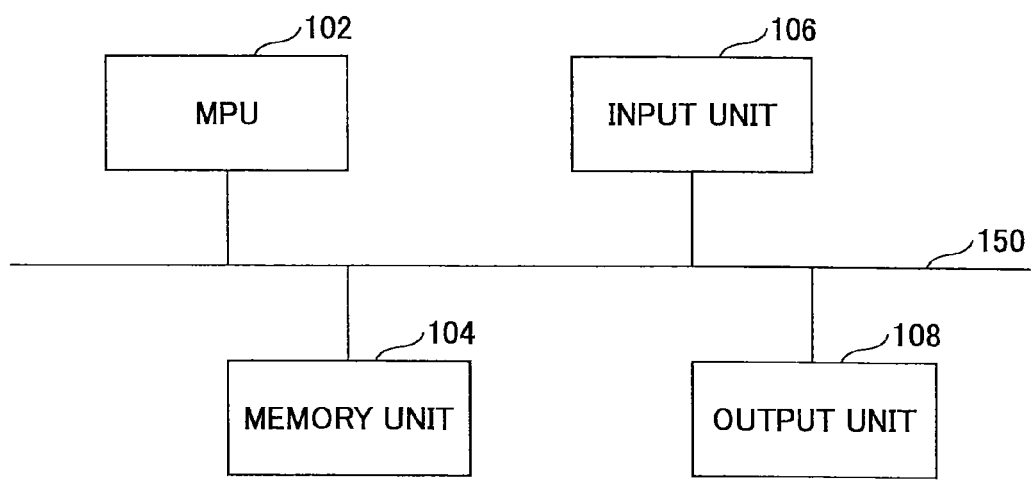
FIG. 1 is a drawing illustrating an example of the present embodiments of a testing apparatus.

FIG. 1 shows an example of the present embodiments of the testing apparatus 100 in which the automated evaluation tool is stored.

The testing apparatus 100 includes a microprocessor (MPU: Micro-Processing Unit) 102, a memory unit 104, an input unit 106, and an output unit 108. The MPU 102, the memory unit 104, the input unit 106 and the output unit 108 are connected by a bus 150.

The MPU 102 controls the memory unit 104, the input unit 106 and the output unit 108. The MPU 102 functions according to the program stored in the memory unit 104, and performs a certain process.

In the memory unit 104, an application, an Operating System (OS) and an automated evaluation tool are stored. For example, the memory unit 104 is an external memory device that stores data and programs in a computer. The memory unit 104 includes, for example, a hard disk (fixed disk), a flexible disk, an MO (Magneto-Optical disk), CD-R (Compact Disk Recordable), and a magnetic tape. The application is software that includes functions performing tasks to be executed on the testing apparatus 100 by the user. For example, the application includes a word processor, spreadsheet software, a database management system (DBMS), and a media player. The Operating System is software that provides hardware-abstracted interfaces to the application software in the testing device 100. The automated evaluation tool is a tool for evaluating at least one of software quality or software functionality by causing software installed in the mobile terminal to operate by operating the mobile terminal on behalf of the user.

The input unit 106 is configured with, for example, a keyboard or a mouse, and sends instructions to the testing device 100 or performs data input. Also, the input unit 106 may be configured with a touch panel. The instructions to the testing device 100 include instructions for the operating system, instructions for the application, and instructions for the automated evaluation tool.

The output unit 108 is configured with, for example, a display, and displays a process status and a process result of the testing device 100. The process status and the process result includes those of the Operating System, the application and the automated evaluation tool. The display includes a liquid crystal display, a CRT (Cathode Ray Tube) display, a plasma (PDP: Plasma Display Panel) display, an organic EL (Electro-Luminescence) display, etc.

<Mobile Terminal 200>

The mobile terminal 200 includes an input device such as a touch panel, etc. By having the touch panel operated by the user, the mobile terminal 200 performs predefined functions.

Figure 2:
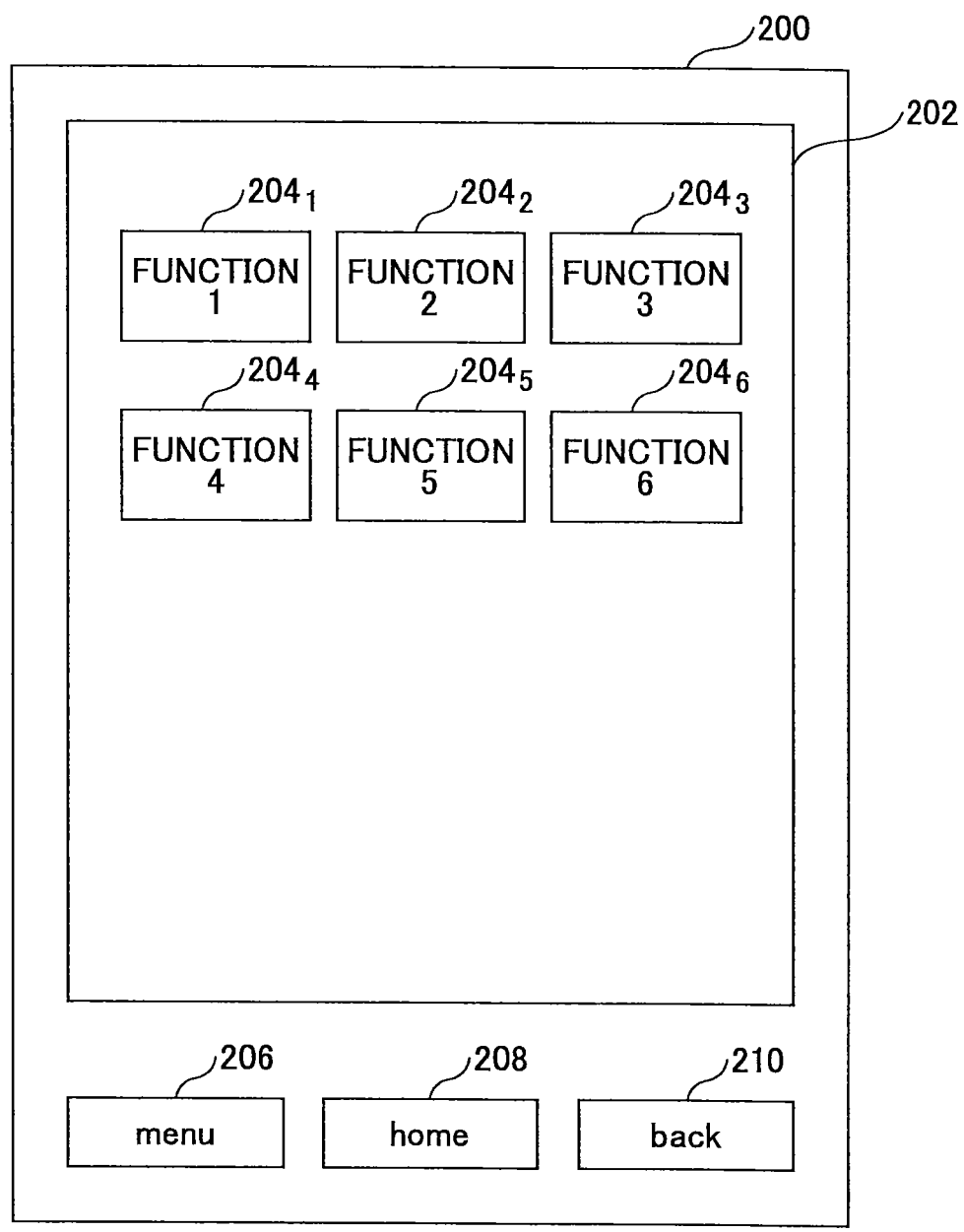
FIG. 2 is a drawing illustrating an example of the present embodiments of a mobile terminal.

FIG. 2 illustrates a present embodiment of the mobile terminal 200.

The mobile terminal 200 includes a display screen 202. On the display screen 202, one or a plurality of icons $204_1$ through $204_6$ are displayed. In an example illustrated in FIG. 2, six icons are shown, but the number of icons can be 1 to 5, or can be equal to or more than 7. By having the user pressing any of the icons $204_1$ through $204_6$, a function corresponding to the pressed icon is performed.

Furthermore, the mobile terminal 200 includes a "menu key 206", a "home key 208", and a "back key 210". By having any one of a "menu key 206", a "home key 208", and a "back key 210" pressed, a function corresponding to the pressed key is performed.

<An Example of a Configuration of a Testing System>

In a testing system, the mobile terminal 200 and the testing apparatus 100 are connected. For example, the mobile terminal 200 and the testing apparatus 100 may be connected by a cable (not shown in the figure). It is preferable that the mobile terminal 200 includes a user interface (UI) for accepting an operation of a user. For example, the UI includes a touch panel, etc. Also, the mobile terminal 200 may not need to include the UI if it can change the internal operation by an electric signal. For example, the mobile terminal 200 may be of a card type, or of a module type.

Also, the testing system may be equipped with a camera for taking pictures displayed on the display screen 202 of the mobile terminal 200. The camera takes at least one of a picture and a moving picture displayed on the display screen 202 of the mobile terminal 200. The at least one of the picture and the moving picture displayed on the display screen 202 taken by the camera is inputted to the testing device 100. For example, by connecting between the camera and the testing device 100 with a cable (not shown in the figure), the at least one of the picture and the moving picture may be transmitted and received between the camera and the testing device 100 via the cable.

<Automated Evaluation Tool>

Figure 3:
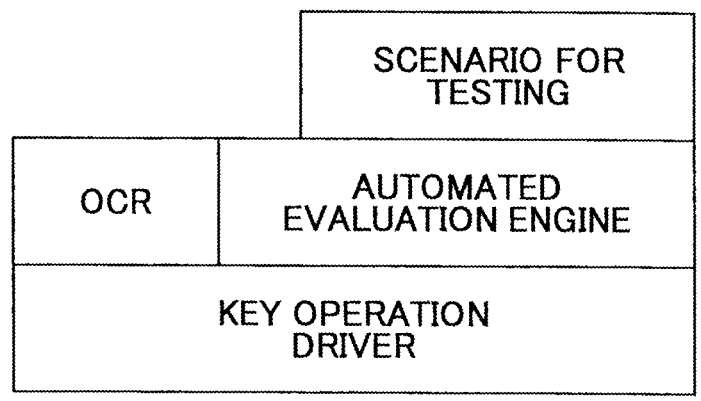
FIG. 3 is a drawing illustrating an example of the present embodiments of an automated evaluation tool.

FIG. 3 shows an example of a configuration of the automated evaluation tool.

The automated evaluation tool includes a key operation driver. The key operation driver is software for providing the MPU 102 that functions as the Operating System with an interface to the mobile terminal 200.

The automated evaluation tool includes an automated evaluation engine. The automated evaluation engine is software for the MPU 102 that functions as the automated evaluation tool to perform a function to evaluate software installed in the mobile terminal 200.

The automated evaluation tool includes an OCR (Optical Character Reader). The OCR optically reads a character from a picture that is taken from a part or the whole of what is displayed on the display screen 202 of the mobile terminal 200, and identifies the character by referring to a pattern stored in advance. The OCR may be an OCR that optically reads a character from a moving picture that is taken from a part or the whole of what is displayed on the touch panel of the mobile terminal 200, and identifies the character by referring to a pattern stored in advance.

Also, in the automated evaluation tool, an image recognizing function may be installed.

At least one of a picture and a moving picture may be obtained by a function included in the mobile terminal 200. The function for obtaining at least one of a picture and a moving picture included in the mobile terminal 200 may be a screenshot, a screen dump, or a screen capture. The screenshot is data that record a display on the display screen in a universal format such as BMP (Bit Map), PNG (Portable Network Graphics), JPEG (Joint Photographic Experts Group), etc. The screen dump is internal data obtained temporarily by a XWD (X Window Dump), etc. The screen capture is data that record the changing of the screen as a moving picture.

<Scenario for Testing>

The automated evaluation tool includes a scenario for testing. The scenario for testing is a scenario in which a procedure of operations to be executed by the mobile terminal 200 is indicated when a function is evaluated by the automated evaluation tool. For example, the scenario for testing is created by running the automated evaluation tool.

Figure 4:
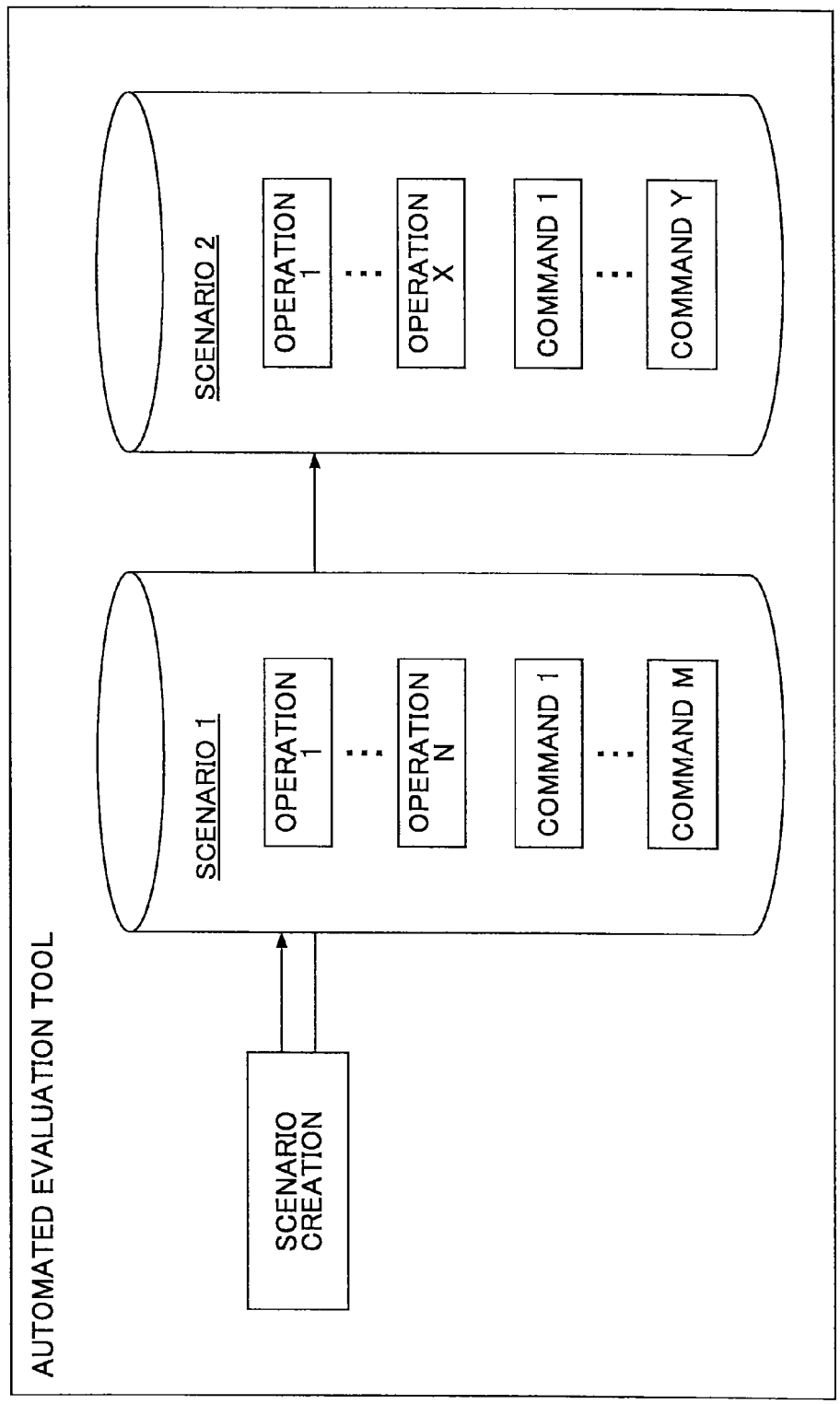
FIG. 4 is a drawing illustrating an example of the present embodiments of a scenario.

FIG. 4 is a drawing illustrating an example of the scenario for testing. In FIG. 4, as examples, two scenarios (scenario 1 and scenario 2) are shown. A scenario may be prepared for each application that runs when evaluating functions of the mobile terminal 200. To be more precise, an email transmission, an outgoing telephone call, an outgoing packet call, a usage of a paid service, a connection to a Web page, etc., are included.

When a scenario for testing is created, a name for defining a scenario (scenario name) is created. For example, as scenario names, "scenario 1" and "scenario 2" are created.

Furthermore, for each scenario, an "operation" for indicating a key that is an operation target for executing the scenario and a "command" for indicating a flow of the key are described. For example, in the scenario indicated by the scenario name "scenario 1", information indicating keys to be operated ("operation 1", . . . , "operation n") and commands for controlling the operation procedure of the keys to be operated ("command 1", . . . , "command m") are included. The "operation" is associated with the name of a part of an operation target. To be more precise, the part of an operation target includes a touch panel and buttons. Also, the part of an operation target may include a measurement command, a parameter, etc.

Figure 5:
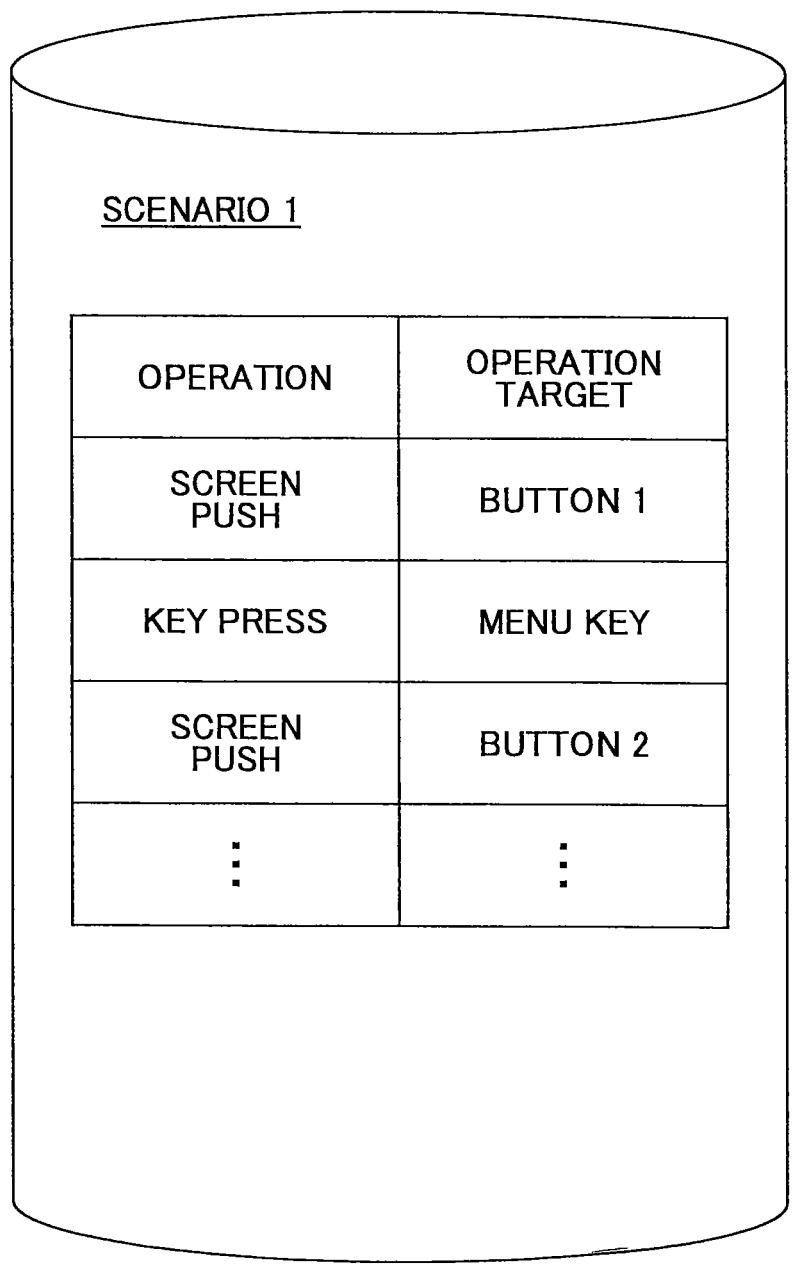
FIG. 5 is a drawing illustrating an example of the present embodiments of a scenario.

FIG. 5 shows a present embodiment of the scenario. In FIG. 5, operations of scenario 1 are shown.

The "operation" included in the scenario 1 includes a "screen push", and the operation target associated with the "screen push" includes a "button 1". Likewise, The "operation" includes "key press", and the operation target associated with the "key press" includes a "menu key". The "operation" includes "screen push", and the operation target associated with the "screen push" includes a "button 2". Also, not shown in the figure, the "operation" includes "GPS measurement", and the operation target associated with the "GPS measurement" includes a "measurement command" or a "parameter".

What is shown in FIG. 5 is an example and can be changed as needed.

Also, in the scenario indicated by the scenario name "scenario 2", information indicating keys to be operated ("operation 1", . . . , "operation x") and commands for controlling the operation procedure of the keys to be operated ("command 1", . . . , "command y") are included.

Also, a plurality of the scenarios may be put together to define a single scenario. For example, a plurality of the scenarios for an evaluation target may be put together to define a single new scenario.

Figure 6:
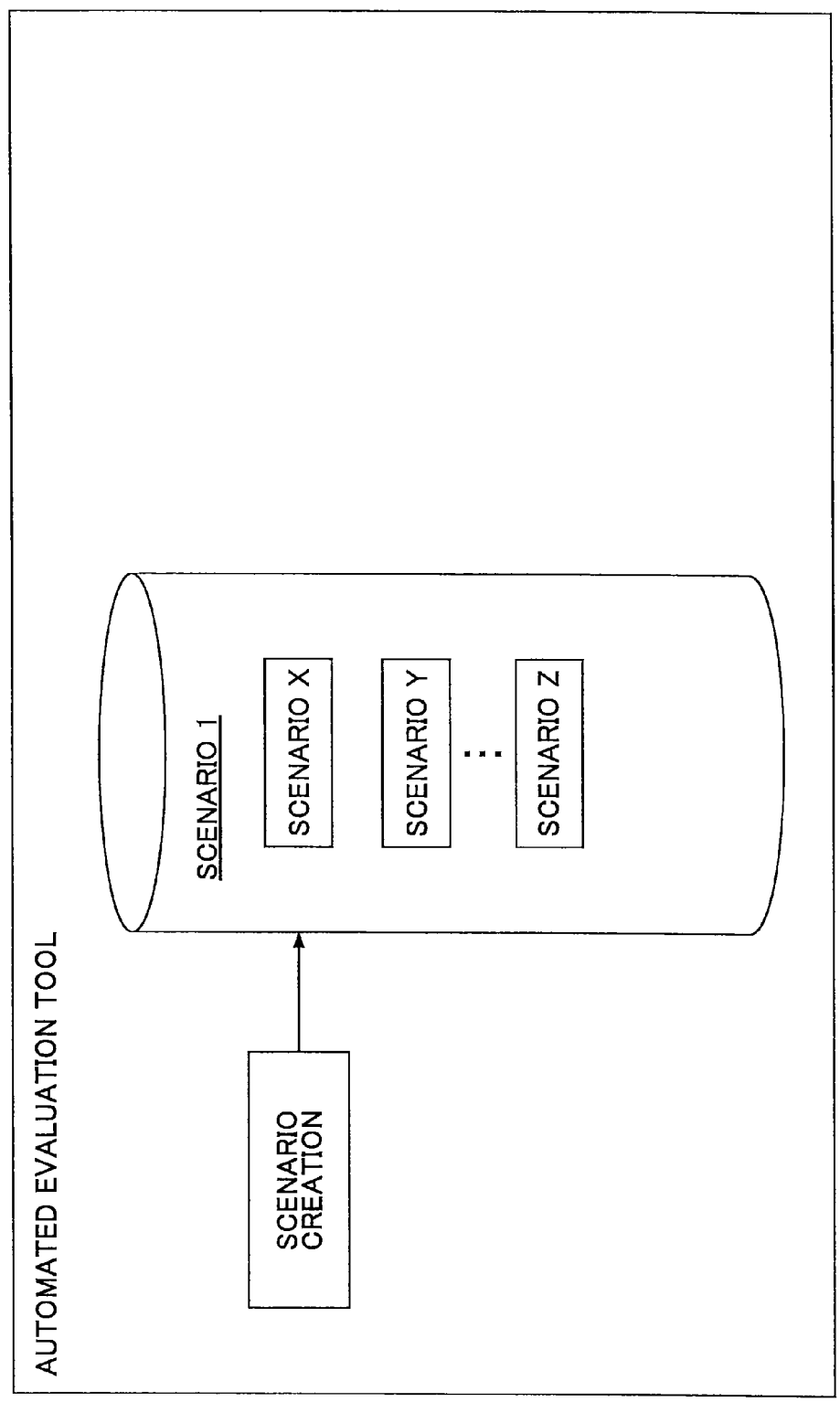
FIG. 6 is a drawing illustrating an example of the present embodiments of a scenario.

FIG. 6 illustrates an example in which a plurality of the functions are put together to be defined as a single new function.

In an example shown in FIG. 6, a plurality of the scenarios ("scenario X", "scenario Y", "scenario Z") are put together to be defined as a single new scenario ("scenario 1"). In other words, in the "scenario 1", the plurality of the scenarios ("scenario X", "scenario Y", . . . , "scenario Z") are nested.

<Device Dependency Determining Process>

It is determined by the automated evaluation tool whether an operation for executing a function of an evaluation target depends on the device or not.

FIG. 7 shows an example of the present embodiment of a device dependency definition that is used when it is determined by the automated evaluation tool whether an operation for executing a function of an evaluation target depends on the device or not.

In an example shown in FIG. 7, information indicating an operation and information indicating an existence or a non-existence of device dependency are stored, the information indicating an operation being associated with the information indicating an existence or a non-existence of device dependency. To be more precise, regarding the "screen push" operation, because the pushed location varies depending on the device, the device dependency is set as "yes". Regarding the "key press" operation, because the location to be pressed varies depending on the device, the device dependency is set as "yes". Regarding the "GPS measurement" operation, because the a measurement command of the "GPS measurement" and a parameter vary depending on the device, the device dependency is set as "yes". Regarding the "email delivery confirmation" operation, because it is assumed that there is no influence from the device difference, the device dependency is set as "no". Regarding the "application update" operation, because it is assumed that there is no influence from the device difference, the device dependency is set as "no".

What is shown in FIG. 7 is an example and can be set as needed. The device dependency may be set for other operations.

<Operation Target Conversion Process>

In the case where it is determined that an operation for performing a function of an evaluation target depends on the device as a result of determination by the automated evaluation tool, an operation target conversion process is performed.

Here, it will be described for the case where the operation that is determined to depend on the device is a "screen push" or a "key press". For other cases, the operation content will be converted so as to fit the device.

Screen information is obtained by the automated evaluation tool. To be more precise, a picture of the display screen 202 of the mobile terminal 200 described referring to FIG. 2 is obtained. The picture of the display screen may be obtained by a camera or by a function included in the mobile terminal 200.

The screen information is analyzed by the automated evaluation tool. To be more precise, locations of a plurality of icons included in the display screen are recognized. For example, the locations may be recognized by an image recognizing function.

The coordinates of the locations of the recognized icons are calculated by the automated evaluation tool. The automated evaluation tool associates a function to be executed by pressing the icon with the coordinates of the location of the icon. To be more precise, the function to be executed by pressing the icon may be identified by recognizing the image of the icon itself. When the function to be executed by pressing the icon is identified, in order to recognize characters included in the icon, OCR may be used.

FIG. 8 is an example of an analysis result of the screen information.

In FIG. 8, the name of the icon obtained by analyzing the screen information, information indicating the layer of the function to be executed by operating the icon, a type of the icon and information indicating the location of the icon are stored.

The part to become an operation target associated with the "operation" included in the scenario is associated with the coordinates by the automated evaluation tool.

By having the information indicating the location of the icon calculated in accordance with the device by the automated evaluation tool, regardless of the device included in the mobile terminal 200, the icon's location that should be specified at the time of evaluation can be converted.

Also, the measurement command and the parameters at the time of GPS measurement are converted by the automated evaluation tool. By having the measurement command and the parameters converted, regardless of the device (GPS chip) included in the mobile terminal 200, the measurement command and the parameters can be converted to fit the device.

<Functions of the Automated Evaluation Tool>

Figure 9:
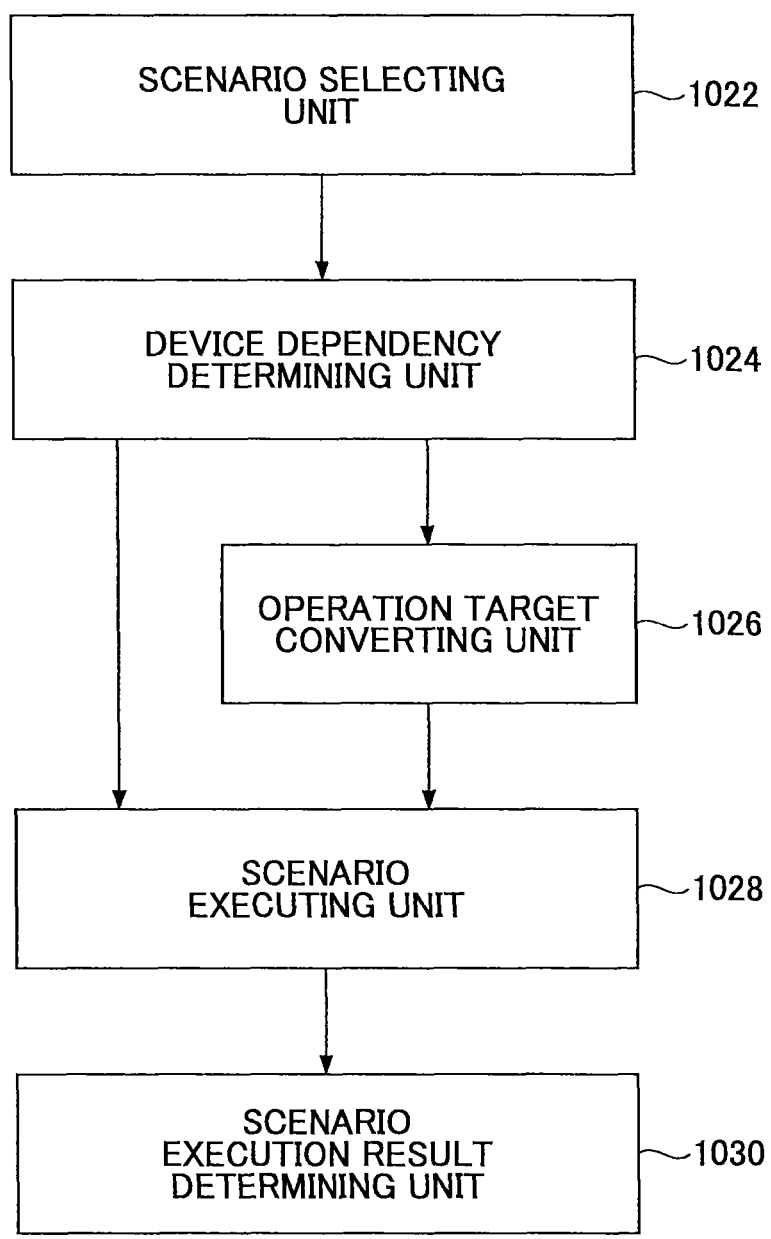
FIG. 9 is a functional block diagram illustrating an example of the present embodiments of a testing apparatus.

FIG. 9 is a functional block diagram indicating an embodiment of the present invention of the testing apparatus 100. In FIG. 9, functions mainly executed by the MPU 102 according to the automated evaluation tool stored in the memory unit 104 are shown.

The testing apparatus 100 includes a scenario selecting unit 1022. The scenario selecting unit 1022 selects a scenario to be executed by the mobile terminal 200. For example, the scenario selecting unit 1022 may select a scenario to be executed by the mobile terminal 200 from a plurality of the scenarios set in advance. The scenario selecting unit 1022 inputs information indicating the selected scenario to a device dependency determining unit 1024.

The testing apparatus 100 includes the device dependency determining unit 1024. The device dependency determining unit 1024 is connected to the scenario selecting unit 1022. The device dependency determining unit 1024 determines whether an operation included in the scenario selected by the scenario selecting unit 1022 depends on the device or not. To be more precise, the device dependency determining unit 1024 determines, referring to the device dependency definition shown in FIG. 7, whether operations included in the scenario include an operation that depends on the device or not. The device dependency determining unit 1024 inputs information indicating operations that depend on the device to an operation target converting unit 1026. The device dependency determining unit 1024 inputs information indicating operations that don't depend on the device to a scenario executing unit 1028.

The testing apparatus 100 includes the operation target converting unit 1026. The operation target converting unit 1026 is connected to the device dependency determining unit 1024. The operation target converting unit 1026 converts an operation target so that it will fit the device installed in the mobile terminal 200 of the evaluation target based on the information from the device dependency determining unit 1024 indicating an operation that depends on the device. To be more precise, the coordinates of the icon may be converted in accordance with the size of the touch panel of the mobile terminal 200. Also, the measurement command and parameters at the time of GPS measurement may be converted. The operation target converting unit 1026 inputs to the scenario executing unit 1028 information indicating the operation whose operation target is converted.

The testing apparatus 100 includes the scenario executing unit 1028. The scenario executing unit 1028 is connected to the device dependency determining unit 1024 and the operation target converting unit 1026. The scenario executing unit 1028 executes the scenario selected by the scenario selecting unit 1022. When the scenario selected by the scenario selecting unit 1022 is executed, operations determined to not depend on the device by the device dependency determining unit 1024 and operations whose operation target is converted by the operation target converting unit 1026 in accordance with the device are executed. The scenario executing unit 1028 inputs an execution result of the scenario to a scenario execution result determining unit 1030.

The testing apparatus 100 includes the scenario execution result determining unit 1030. The scenario execution result determining unit 1030 is connected to the scenario executing unit 1028. The scenario execution result determining unit 1030 determines whether the execution result of the scenario is the same as a result assumed in advance based on the execution result of the scenario inputted by the scenario executing unit 1028. In the case where the execution result of the scenario is the same as the result assumed in advance, the scenario execution is determined to be a success. On the other hand, in the case where the execution result of the scenario is different from the result assumed in advance, the scenario execution is determined to be a failure. The scenario execution result determining unit 1030 reflects the execution result of the scenario in execution result information. In the execution result information, the number of execution failures of the scenario is stored for each scenario.

<Operations of the Testing Apparatus>

Figure 10:
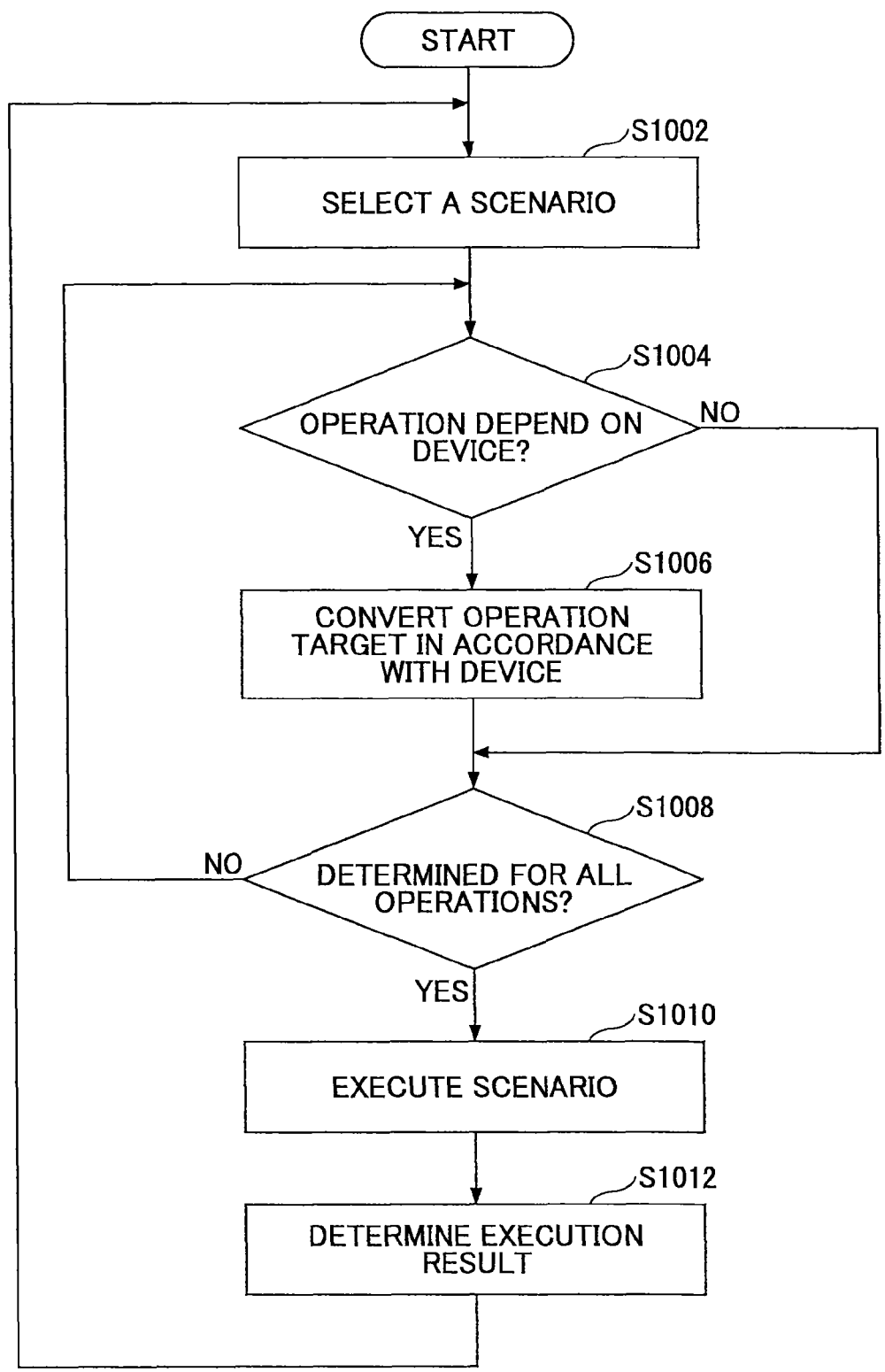
FIG. 10 is a flow chart illustrating an example of the present embodiments of operations of a testing apparatus.

FIG. 10 illustrates an example of the present embodiment of operations of the testing apparatus 100.

The testing apparatus 100 selects a scenario (step S1002). A plurality of the scenarios may be selected. For example, the scenario selecting unit 1022 selects one of the scenarios.

The testing apparatus 100 determines whether an operation included in the scenario selected at step S1002 depends on the device. That is, the device dependency determining unit 1024 refers to the device dependency definition and determines whether the operation included in the scenario depends on the device. In the case where a plurality of the operations are included in the scenario, it is determined for each of the operations whether the operation depends on the device.

In the case where the operation depends on the device (step S1004:YES), the testing apparatus 100 converts the operation target in accordance with the device (step S1006). That is, in the case where the operation included in the scenario depends on the device, the operation target converting unit 1026 converts the target of the operation that depends on the device to fit the device.

After the operation target is converted to fit the device, or in the case where the operation is not determined to depend on the device (step S1004: NO), the testing apparatus determines whether the determination of whether the operation depends on the device is finished for all the operations (step S1008).

In the case where the determination for all operations is not finished (step S1008: NO), the step returns to step S1004. The testing apparatus 100 performs step S1004 through step S1006 for operations for which the determination of the device dependency is not finished.

In the case where the determination for all operations is finished (step S1008: YES), the testing apparatus 100 executes the scenario (step S1010). That is, the scenario executing unit 1028 executes the scenario.

The testing apparatus 100 determines the execution result of the scenario (step S1012). For example, the scenario execution result determining unit 1030 determines whether the execution result of the scenario is a success by determining whether the execution result of the scenario is the same as the result assumed in advance.

After the determination of the execution result of the scenario at step S1012, the step returns to step S1002.

The program causing the MPU 102 to function as the testing apparatus 100 is provided in the stored state in a recording medium such as a flexible disk, a CD-ROM, a memory card, etc. Also, the program may be downloaded. When the recording medium is inserted into an auxiliary storage device of a computer, the program stored in the recording medium is read. The MPU 102 writes the read program onto an RAM or an HDD, and performs the processes. The program causes the computer to perform the processes of step S1002 through S1012 of FIG. 10. Also, for example, the program may cause the computer to perform at least a portion of the processes.

<Details of the Device Dependency Checking Process>

Figure 11:
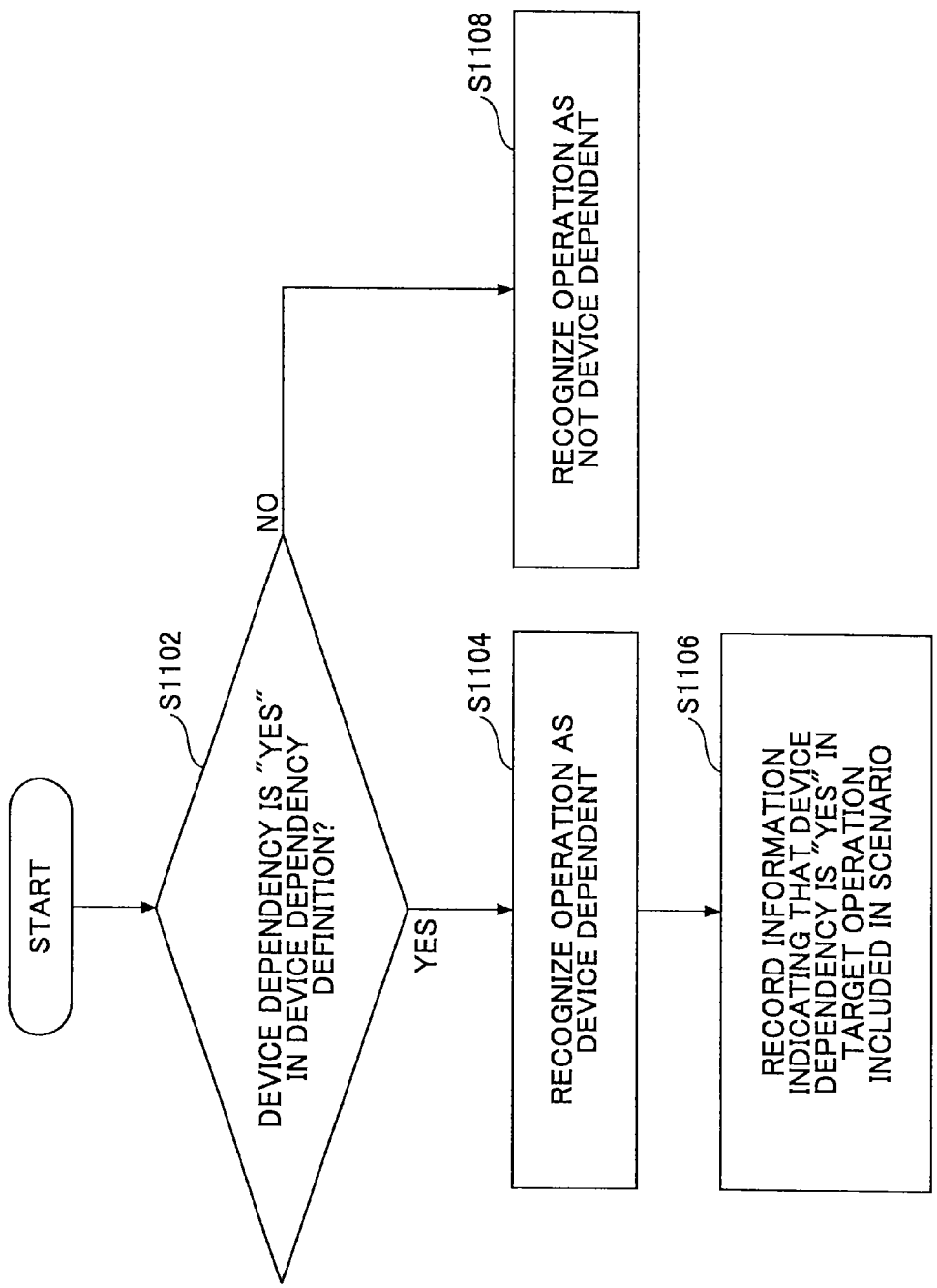
FIG. 11 is a flow chart illustrating an example of the present embodiments of operations of a testing apparatus.

FIG. 11 shows the detailed operations executed by the device dependency determining unit 1024.

The device dependency determining unit 1024 determines whether the device dependency associated with the operation included in the scenario is "YES" (step S1102).

In the case where the device dependency is "YES" (step S1102: YES), the device dependency determining unit 1024 recognizes that the operation is device dependent. (step S1104).

The device dependency determining unit 1024 associates the target operation included in the scenario with information indicating that the device dependency is "YES" and records them (step S1106).

In the case where the device dependency is not "YES" (step S1102: NO), the device dependency determining unit 1024 recognizes that the operation is not device dependent (step S1108).

The program causing the MPU 102 to function as the device dependency determining unit 1024 is provided in the stored state in a recording medium such as a flexible disk, a CD-ROM, a memory card, etc. Also, the program may be downloaded. When the recording medium is inserted into an auxiliary storage device of a computer, the program stored in the recording medium is read. The MPU 102 writes the read program onto an RAM or an HDD, and performs the process. The program causes the computer to perform the processes of step S1102 through S1108 of FIG. 11. Also, for example, the program may cause the computer to perform at least a portion of the processes.

<Details of the Operation Target Converting Process>

Figure 12:
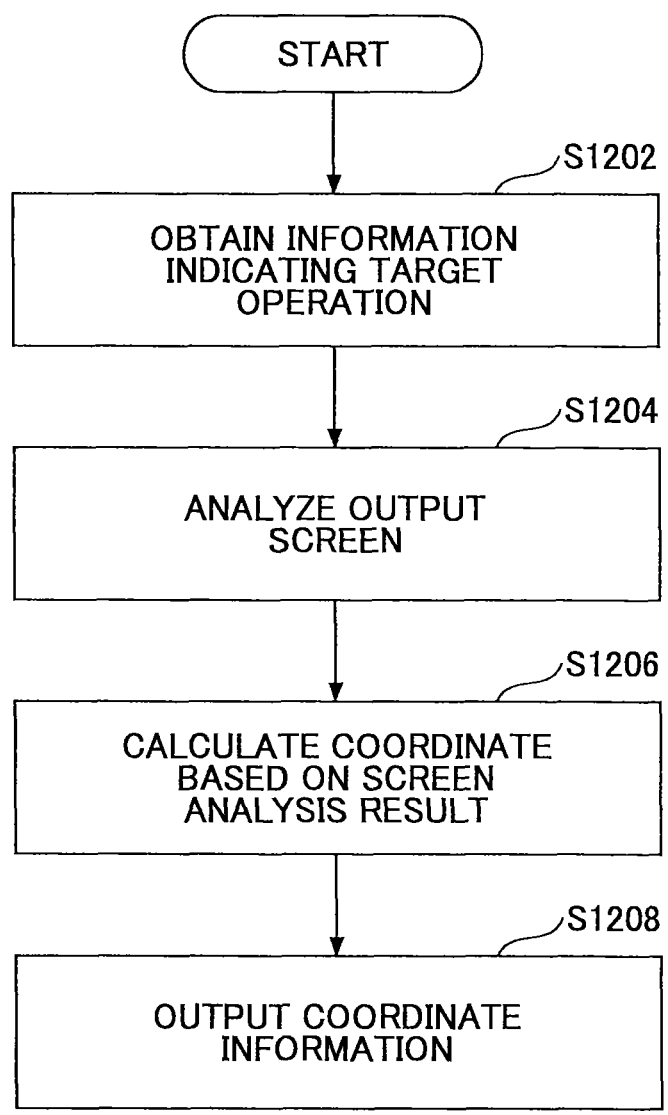
FIG. 12 is a flow chart illustrating an example of the present embodiments of operations of a testing apparatus.

FIG. 12 shows the detailed operations executed by the operation target converting unit 1026. In FIG. 12, an example in which coordinates of an icon are converted in accordance with the size of the touch panel of the mobile terminal 200 is shown.

The operation target converting unit 1026 obtains information indicating the operation target (step S1202). The operation target converting unit 1026 obtains from the device dependency determining unit 1024 information indicating the operation target associated with the operation that is determined to be device dependent.

The operation target converting unit 1026 analyzes the output screen (step S1204). The operation target converting unit 1026 obtains and analyzes a picture displayed on the display screen 202 of the mobile terminal 200. To be more precise, the operation target converting unit 1026 analyzes location information of an icon included in a picture displayed on the display screen 202.

The operation target converting unit 1026 calculates the coordinates based on the result of the screen analysis (step S1206). The operation target converting unit 1026 converts the location information of the icon included in the picture displayed on the display screen 202 into coordinates.

The operation target converting unit 1026 outputs the coordinate information (step S1208). The operation target converting unit 1026 inputs the coordinate information to the scenario executing unit 1028.

The program causing the MPU 102 to function as the operation target converting unit 1026 is provided in the stored state in a recording medium such as a flexible disk, a CD-ROM, a memory card, etc. Also, the program may be downloaded. When the recording medium is inserted into an auxiliary storage device of a computer, the program stored in the recording medium is read. The MPU 102 writes the read program onto an RAM or an HDD, and performs the process. The program causes the computer to perform the processes of step S1202 through S1208 of FIG. 12. Also, for example, the program may cause the computer to perform at least a portion of the processes.

In the present embodiment described above, as an example of a device dependent operation, a "push-screen operation" and a "key-press operation" are shown, and are applied to operations specifically utilizing coordinates.

Also, an operation target may be changed depending on a sensor installed in the mobile terminal 200. To be more precise, the operation target may be changed in accordance with the sensitivity or the temperature of the sensor.

According to the present embodiment, regardless of the device included in a mobile terminal, functions installed in the mobile terminal can be evaluated.

A testing apparatus and a testing method according to the present embodiments are described above, but the present invention is not limited to the above embodiments, and various modifications and refinements may be made without departing from the scope of the present invention.

For the sake of convenience, the present embodiments are described using specific numbers in order to facilitate understanding of the invention, but these numbers are used just as examples and, unless otherwise noted, any appropriate number can be used. For the sake of convenience, devices of the present embodiments are described using a functional block diagram, but those devices may be realized as hardware, software, or a combination of both.

The present application is based on and claims the benefit of priority of Japanese Priority Application No. 2011-256422 filed on Nov. 24, 2011 the entire contents of which are hereby incorporated by reference.

DESCRIPTION OF THE REFERENCE NUMERALS

100 Testing apparatus
102 MPU
104 Memory unit
106 Input unit
150 Bus
200 Mobile terminal
202 Display screen
204$_n$ (n is an integer, n>0) Icon
206 Menu key
208 Home key
210 Back key
1022 Scenario selecting unit
1024 Device dependency determining unit
1026 Operation target converting unit
1028 Scenario executing unit
1030 Scenario execution result determining unit

The invention claimed is:

1. A testing apparatus for evaluating operations by software installed in a mobile terminal, the testing apparatus comprising:
    circuitry configured to
        set a scenario including operation information for executing functions that are performed by the mobile terminal;
        determine whether an operation indicated by the operation information included in the scenario is influenced by a device installed in the mobile terminal;
        convert the operation determined to be influenced by the device installed in the mobile terminal in accordance with the device installed in the mobile terminal;
        execute the scenario according to the converted operation; and
        determine whether an execution result of the executed scenario is the same as a result assumed in advance, wherein
    in the case where at least one of a screen-push operation and a key-press operation is included in the operation indicated by the operation information included in the scenario, the circuitry determines that the operation is influenced by the device installed in the mobile terminal, and in the case where at least one of the screen-push operation and the key-press operation is included in the operation determined to be influenced by the device installed in the mobile terminal, the circuitry is configured to calculate a range of coordinates for executing at least one of the screen-push operation and the key-press operation by analyzing information of a screen displayed on the mobile terminal.

2. The testing apparatus as claimed in claim 1, wherein the circuitry is configured to analyze the information of the screen obtained by a function for obtaining the information of the screen installed in the mobile terminal.

3. The testing apparatus as claimed in claim 1, wherein in the case where an operation for performing a GPS measurement is included in the operation indicated by the operation information included in the scenario, the circuitry is configured to determine that the operation is influenced by the device installed in the mobile terminal.

4. The testing apparatus as claimed in claim 1, wherein in the case where the operation for performing the GPS measurement is included in the operation determined to be influenced by the device installed in the mobile terminal, the circuitry is configured to convert at least one of a measurement command and a parameter for performing the GPS measurement.

5. The testing apparatus as claimed in claim 1, wherein the scenario includes one or a plurality of the functions to be performed by the mobile terminal.

6. A testing method in a testing apparatus for evaluating operations by software installed in a mobile terminal, the testing method comprising:

a scenario setting step of setting a scenario including operation information for executing functions that are performed by the mobile terminal, an operation determining step of determining whether an operation indicated by the operation information included in the scenario set by the scenario setting step is influenced by a device installed in the mobile terminal, an operation target converting step of converting the operation determined to be influenced by the device installed in the mobile terminal by the operation determining step in accordance with the device installed in the mobile terminal, a scenario executing step of executing the scenario set by the scenario setting step according to the operation converted by the operation target converting step, and a scenario execution result determining step of determining whether an execution result of the scenario executed by the scenario execution step is the same as a result assumed in advance, wherein in the case where at least one of a screen-push operation and a key-press operation is included in the operation indicated by the operation information included in the scenario set by the scenario setting step, the operation determining step includes determining that the operation is influenced by the device installed in the mobile terminal, and in the case where at least one of the screen-push operation and the key-press operation is included in the operation determined to be influenced by the device installed in the mobile terminal by the operation determining step, the operation target converting step includes calculating a range of coordinates for executing at least one of the screen-push operation and the key-press operation by analyzing information of a screen displayed on the mobile terminal.

\* \* \* \* \*